United States Patent [19]

Salzmann

[11] 4,371,920
[45] Feb. 1, 1983

[54] POLYPHASE FREQUENCY CONVERTER WITH INDIVIDUALLY CURRENT-REGULATED OUTPUTS

[75] Inventor: Theodor Salzmann, Erlangen, Fed. Rep. of Germany

[73] Assignee: Siemens Aktiengesellschaft, Munich, Fed. Rep. of Germany

[21] Appl. No.: 284,997

[22] Filed: Jul. 20, 1981

[30] Foreign Application Priority Data

Aug. 1, 1980 [DE] Fed. Rep. of Germany ....... 3029320

[51] Int. Cl.³ ............................................. H02M 5/27
[52] U.S. Cl. ...................................... 363/160; 363/70
[58] Field of Search .............. 363/159, 160, 164, 165, 363/65, 70; 318/802, 803, 807–811

[56] References Cited

U.S. PATENT DOCUMENTS

| 3,970,914 | 7/1976 | Salzmann et al. | 363/70 X |
| 4,008,428 | 2/1977 | Waldmann et al. | 363/160 |
| 4,074,348 | 2/1978 | Salzmann et al. | 363/160 |

*Primary Examiner*—William M. Shoop
*Assistant Examiner*—Peter S. Wong
*Attorney, Agent, or Firm*—Kenyon & Kenyon

[57] ABSTRACT

A system for controlling the current of a direct converter or a pulse inverter having m subconverters, each such subconverter having two outputs. One of the outputs is connected to a neutral point of the converter, and not to a load. The other output of each subconverter is provided with a separate current regulator, and connected to the load. Divergence between the voltage of the neutral point of the converter and the neutral point of the load is prevented by providing a controller with a resistive feedback line.

3 Claims, 5 Drawing Figures

POLYPHASE FREQUENCY CONVERTER WITH INDIVIDUALLY CURRENT-REGULATED OUTPUTS

BACKGROUND OF THE INVENTION

This invention relates generally to frequency converters for supplying multiphase loads, and more particularly, to a frequency converter for supplying a multiphase load, the frequency converter having a predetermined number of subconverters with AC voltage outputs, one output of each subconverter being brought to a common converter neutral point which is not connected to the multiphase load. Output current is impressed upon each subconverter by a separate current regulator.

Converters are frequently used to supply electrical energy to multiphase loads, having illustratively $m$ phases. Such converter arrangements consist of $m$ subconverters, where each subconverter has two AC outputs, one such output being brought to a common neutral point of the converter. A separate current regulator is advantageously utilized to impress the output current upon each subconverter during current-controlled operation of the converter. In situations where the neutral point of the converter is connected to a neutral point of a load, the current regulators will determine the magnitude of the currents flowing through each converter output.

U.S. Pat. No. 4,008,428 describes an arrangement wherein the neutral point of the converter is not connected to the neutral point of the machine because the machine current has a lower harmonic content, and the converter can be operated with a trapezoidal output voltage. Such a trapezoidal output voltage results in improved efficiency of the converter and the machine. However, since the sum of the currents at the neutral points of the converter must, in accordance with Kirchhoff's Law, always equal zero, the current regulators overdetermine the currents. If current regulators of the type having an integral component are used, the output voltages of the current regulators can diverge from one another, thereby electrically shifting the neutral point of the converter so that it is no longer at the center of the output phases. This produces an asymmetrical system. As mentioned in the above-identified reference, a common, additional signal is added to the reference values of all $m$ current regulators as a supplemental reference value which is derived from the voltage difference between the converter neutral point and the load neutral point, and this voltage difference is regulated so as to equal zero. This arrangement, however, requires a voltage measuring device at each of the converter and machine neutral points. Such a system is costly, particularly in high-voltage installations which operate at greater than 1,000 volts. In addition, if a load neutral point is inaccessible, an artifical neutral point must be created by means of load resistors.

It is, therefore, an object of this invention to provide a simple and relatively inexpensive multiphase converter arrangement.

SUMMARY OF THE INVENTION

The foregoing and other objects are achieved by this invention which provides a frequency converter arrangement wherein there is provided an additional signal from each current regulator, the additional signal being taken at the output of the current regulator by a resistor. Each individual current regulator is therefore supplemented by an additional ohmic feedback which prevents the controllers from drifting. If the current reference values, the sum of which must equal zero, are chosen for the individual current regulators, divergence of the individual output voltages resulting from drifting of the regulators is prevented, at least over a predetermined time average. Generally, PI-controllers are used as current regulators. The resistor in the additional feedback which is provided in accordance with the invention is selected to have a higher resistance than that of the original PI-feedback. The ratio of the value of the additional resistance to the value of the characteristic resistance in the PI-feedback of the PI controller is advantageously at least 3, and preferably approximately 5. The selection of the resistance values has practically no influence upon the dynamic properties of the control, and only a small static control error occurs, amounting to approximately only 1% to 2% deviation between the reference value and the actual value. Such deviation is without practical significance in drive controls in which the amplitude of the current reference values is derived by a superimposed speed control.

BRIEF DESCRIPTION OF THE DRAWINGS

Comprehension of the invention is facilitated by reading the following detailed description in conjuction with the annexed drawings, in which.

DETAILED DESCRIPTION

Figure 1:
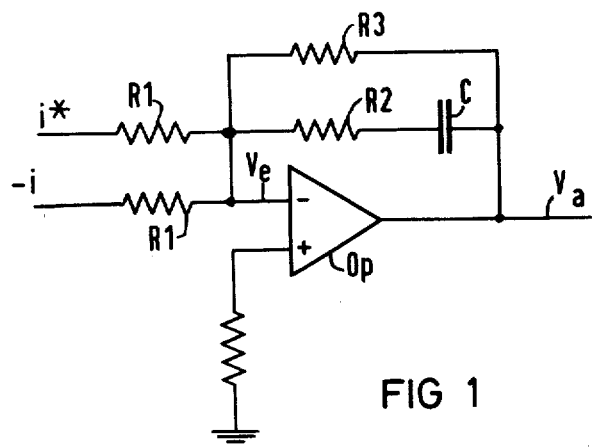
FIG. 1 is a schematic representation of a controller constructed in accordance with the principles of the invention.

FIG. 1 shows a controller arrangement having an operational amplifier $O_p$ having two input resistors, each having a resistance R1. Operational amplifier $O_p$ receives at an inverting input terminal a signal corresponding to the difference between a reference value i* and the actual value $i_{ist}$ of an output current of a subconverter which is associated with a respective controller. A capacitor C and a characteristic feedback resistor R2 are connected in series and provide the PI characteristic of the controller. A further feedback path having a resistor R3 is provided.

Figure 2:
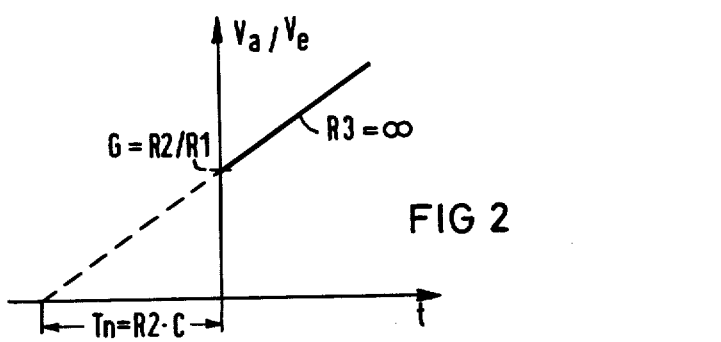
FIG. 2 is a response plot of the characteristics of the controller of FIG. 1 for the case R3 equals infinity.

FIG. 2 shows the case of a conventional PI controller wherein feedback resistor R3 equals infinity. In essence, feedback resistor R3 is not provided in this case, and the gain G of the arrangement is given by the quotient R2/R1. The time constant $T_n$ of the system is given by the product R2×C. The plot shown in FIG. 2 corresponds to "jump response" of the system, the "jump response" being responsive to sudden changes in the value of the input variable i* - $i_{ist}$.

Figure 3:
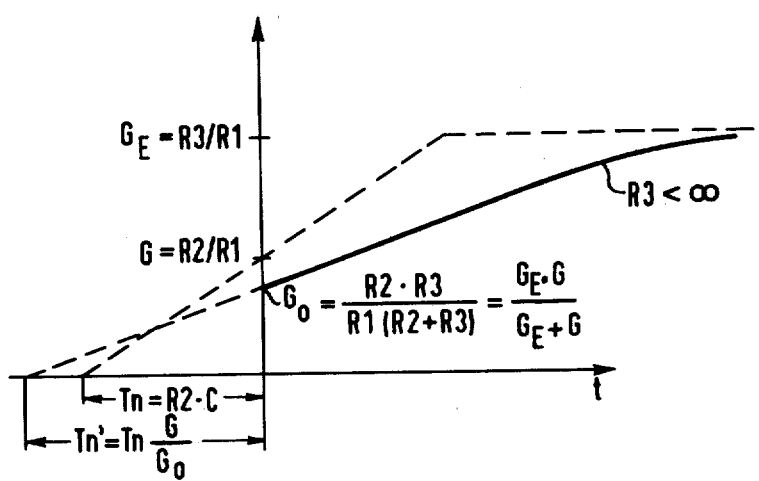
FIG. 3 shows a response plot of the controller of FIG. 1 for the case where R3 is less than infinity.

In accordance with the invention, the resistance R3 has a finite value. FIG. 3 shows the waveform for R3 < ∞. The gain $G_o$ of this embodiment, at time zero, is:

$$G_o = R2 \cdot R3/R1 \cdot (R2+R3).$$

The gain, however, asymptotically approches a value $G_E$, where:

$$G_E = R3/R1.$$

The time constant in this case is:

$$T_m^1 = T_n G/G_o = T_n(G_E+G)/G_E$$

where $G = R2/R1$, and therefore;

$$T_n^1 = C(R2+R3)R2/R3$$

Figure 4:
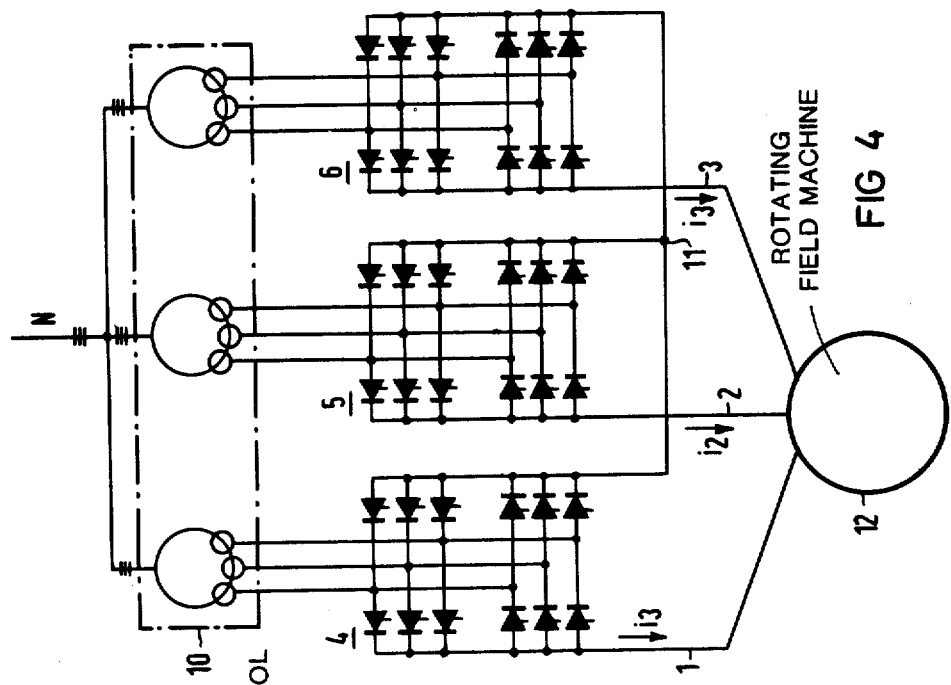
FIG. 4 shows a schematic representation of a controller having three single-phase outputs for supplying a three-phase load.
Figure 5:
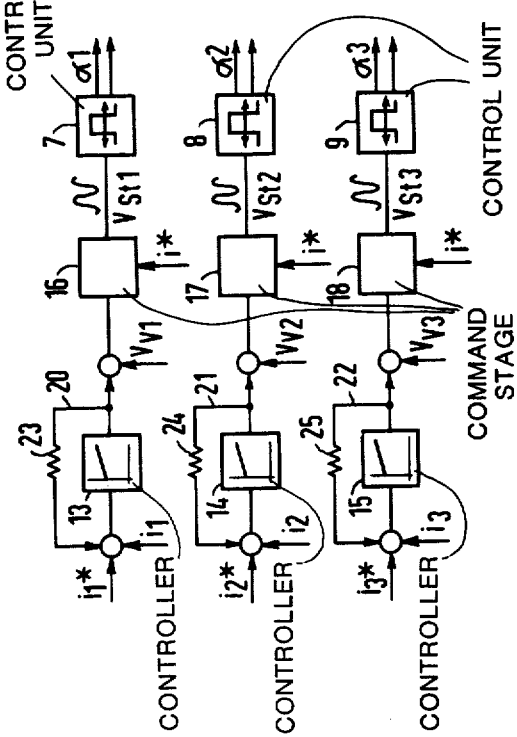
FIG. 5 is a block and schematic representation of a controller embodiment constructed in accordance with the principles of the invention.

FIG. 4 shows a circuit arrangement according to the invention, having a direct converter with three single phase outputs 1, 2, and 3 for supplying a three-phase load. The direct converter consists of three reversing subconverters 4, 5, and 6, the electrical valves of which are addressed by control units 7, 8, and 9, shown in FIG. 5. Each input of each subconverter is connected by a separate secondary winding of a transformer 10 to a three-phase supply network N. A direct converter with reversing converters which operate without circulating currents is advntageously used as the subconverter. However, a pulse converter consisting of subconverters which are supplied from a DC network can also be advantageously used. Each of subconverters 4, 5, and 6 has two AC outputs, one of each of which is connected to a common converter neutral point 11. The other AC output is connected to a terminal of a rotating field machine 12. Neutral point 11 is not connected to any part of machine 12.

Rotating field machine 12 is controlled by providing separate current reference values $i_1*$, $i_2*$, and $i_3*$ respectively to each of the AC outputs 1, 2, and 3; together with the corresponding actual values $i_1$, $i_2$, $i_3$ at inputs of respective controllers 13, 14, and 15, which are associated with respective ones of the subconverters, in the manner described in German Offenlegungschrift Nos. 26 53 762 and 26 57 712, a respective one of control voltages $V_{v1}$, $V_{v2}$, and $V_{v3}$ is supplied to each output signal of the controller, and correspond to the bucking voltage generating by the load. Respective command stages 16, 17, and 18 are provided for switching over between the antiparallel drives of each subconverter if the respective current reference value reverses its polarity.

Control voltages $V_{St1}$, $V_{St2}$, and $V_{St3}$ are generated for the respective subconverters and are conducted to control units 7, 8, and 9 which then address the converters with corresponding control angles $\alpha1$, $\alpha2$, and $\alpha3$. Generally, these control signals have sinusoidal waveforms. This arrangement corresponds to a symmetrical system of output voltages wherein a voltage $V_0=0$ is present at converter neutral point 11. In the case of a symmetrical load, the neutral point of which is not connected to the neutral point of the converter, a trapezoidal waveform of AC voltages which feed the load is desired. According to an advantageous further embodiment of the circuit arrangement, the trapezoidal output voltages are achieved by feeding the sinusoidal control voltages, which are represented by $V_{St} = V_{Sto} \cos \omega t$, to control units which have a linear, proportional relationship $\alpha = kV_{St}$ between the control voltage and the control angle with the proportionality constant $k$. Since, in line communtated converters, the output voltage depends upon the cosine of the control angle:

$$V_a = V_{dio} \cos \alpha,$$

where $V_{dio}$ is the "ideal" no-load DC voltage which corresponds to the output voltage for the control angle $\alpha = 0$, the expression for the output voltage becomes:

$$V_a = V_{dio} \cos \alpha = V_{dio} \cos (K V_{St}) = V_{dio} \cos (KV_{Sto} \sin \omega t).$$

This expression means an approximately trapezoidal waveform, where the fundamental amplitude of the output voltage is increased approximately by the factor 1.14 over the amplitude of the output voltage $V_a$, while the harmonic components of the fifth and seventh order are smaller than 1.5%. Thus, the adavntages resulting from the desired trapezoidal wave shape are achieved in a simple manner.

According to Kirchhoff's Law, $i_1 + i_2 + i_3 = 0$ at the neutral point 11. However, if for example, only two regulators, for controllers 13 and 14, were used for regulating two output currents, the third output current would also be determined thereby. Thus, since a separate current regulator 15 is provided for the third output current $i_3$, the inventive system is overdetermined. Generally, the controllers of regulators 13, 14, and 15 each have a corresponding zero drift; therefore, the regulators interfere with one another even if the condition $i_1* + i_2* + i_3* = 0$ is observed. This interference is avoided by providing for each regulator an additional feedback line 20, 21, and 22 respectively, having corresponding resistors 23, 24, and 25. In this manner, the zero drift of each controller is suppressed, and divergence among the controllers is prevented.

Although the invention has been described in terms of specific embodiments and applications, other embodiments, in light of this teaching, will be obvious to persons skilled in the pertinent art. Accordingly, it is to be understood that the drawings and descriptions in this disclosure are merely illustrative of the principles of the invention, and should not be construed to limit the scope thereof.

What is claimed is:

1. A circuit arrangement having a converter for supplying an m-phase load, the converter having $m$ subconverters, each such subconverter having first and second AC voltage outputs, the first output of each subconverter being connected to a common converter neutral terminal, the arrangement further having a separate current regulator for impressing an output current with an integral signal component on each subconverter, each current regulator having inputs for respectively receiving a signal corresponding to the differnce between a reference value and an actual value of the subconverter output current, and an additional signal, the arrangement further comprising feedback resistor means for conducting the additional signal from the output of each current regulator to an input of the same current regulator.

2. The circuit arrangement of claim 1 wherein each current regulator is a PI controller having a characteristic feedback resistance, and the ratio of said feedback resistor means to said characteristic feedback resistance of said PI controller is at least three.

3. The system of claim 1 wherein the subconverters are each provided with an AC voltage output for generating approximately trapezoidal AC voltages, the circuit arrangement further comprising:
  a plurality of electrical valves associated with each of the subconverters, said electrical valves being connected in an antiparallel configuration for conducting electrical energy in predetermined directions;
  a plurality of control units, each having an input for receiving a sinusoidal control voltage, said control units controlling said electrical valves, said control units further having a linear proportional relationship between a control angle $\alpha$ and a control voltage $V_{st}$, in accordance with $\alpha = k\, V_{st}$, where k is a proportionality constant.

* * * * *